US012807762B2

(12) United States Patent
Austermann et al.

(10) Patent No.: US 12,807,762 B2
(45) Date of Patent: Nov. 24, 2026

(54) POLYSILOXANE DISPERSING AGENT

(71) Applicant: BYK-Chemie GmbH, Wesel (DE)

(72) Inventors: Tobias Austermann, Münster (DE); Verena Boeckmann, Mülheim/Ruhr (DE); Wolfgang Griesel, Hamminkeln (DE); Guillaume Wojciech Jaunky, Wesel (DE); Horst Sulzbach, Raesfeld (DE)

(73) Assignee: BYK-Chemie GmbH, Wesel (DE)

( * ) Notice: Subject to any disclaimer, the term of this patent is extended or adjusted under 35 U.S.C. 154(b) by 621 days.

(21) Appl. No.: 18/276,271

(22) PCT Filed: Feb. 21, 2022

(86) PCT No.: PCT/EP2022/054215

§ 371 (c)(1),
(2) Date: Aug. 8, 2023

(87) PCT Pub. No.: WO2022/179972

PCT Pub. Date: Sep. 1, 2022

(65) Prior Publication Data

US 2024/0141110 A1 May 2, 2024

(30) Foreign Application Priority Data

Feb. 23, 2021 (EP) .................................... 21158583

(51) Int. Cl.

| | |
|---|---|
| ***C08G 77/14*** | (2006.01) |
| ***C08G 77/00*** | (2006.01) |
| ***C08G 77/38*** | (2006.01) |
| ***C08K 3/22*** | (2006.01) |
| ***C08K 7/18*** | (2006.01) |

(52) U.S. Cl.

CPC ............. *C08G 77/14* (2013.01); *C08G 77/38* (2013.01); *C08G 77/70* (2013.01); *C08K 3/22* (2013.01); *C08K 7/18* (2013.01); *C08K 2003/2227* (2013.01); *C08K 2201/005* (2013.01)

(58) Field of Classification Search

CPC .. C08G 77/38; C08L 83/04; C08K 2003/2227
See application file for complete search history.

(56) References Cited

U.S. PATENT DOCUMENTS

| | | | | |
|---|---|---|---|---|
| 6,172,150 | B1 | 1/2001 | Kollmann et al. | |
| 6,194,508 | B1 | 2/2001 | Achenbach et al. | |
| 6,469,379 | B1 | 10/2002 | Matayabas | |
| 7,329,706 | B2 | 2/2008 | Fukui et al. | |
| 8,304,077 | B2 | 11/2012 | Bubat et al. | |
| 9,217,083 | B2 | 12/2015 | Hans et al. | |
| 2009/0035244 | A1 | 2/2009 | Rando et al. | |
| 2009/0253885 | A1 | 10/2009 | Kamei | |
| 2013/0089134 | A1 | 4/2013 | Wang et al. | |
| 2019/0359872 | A1 | 11/2019 | Yoo et al. | |
| 2020/0040152 | A1* | 2/2020 | Yun | B32B 38/00 |
| 2020/0270499 | A1* | 8/2020 | Ota | C09K 5/14 |
| 2024/0010797 | A1* | 1/2024 | Li | C08G 77/38 |

FOREIGN PATENT DOCUMENTS

| | | | |
|---|---|---|---|
| DE | 102005051939 | | 5/2007 |
| EP | 0112845 | | 7/1989 |
| EP | 0931537 | | 8/2006 |
| EP | 2107078 | | 10/2009 |
| JP | 200825527 | | 10/2008 |
| JP | 2020059771 | * | 4/2020 |
| WO | 2003057782 | | 7/2003 |
| WO | 2003078527 | | 9/2003 |
| WO | 2015003978 | | 1/2015 |
| WO | 2018051158 | | 3/2018 |
| WO | 2020223864 | | 11/2020 |

OTHER PUBLICATIONS

Translation of JP2020059771 (Year: 2020).*
International Search Report and Written Opinion for International Application No. PCT/EP2022/054215 dated Apr. 8, 2022.

* cited by examiner

*Primary Examiner* — Robert C Boyle

(57) ABSTRACT

The invention relates to the use of a polysiloxane having a plurality of siloxane groups and at least one cyclic carboxylic anhydride group or the hydrolysis product thereof covalently linked to the polysiloxane, as a dispersing agent for solid particles in a non-aqueous composition.

17 Claims, No Drawings

POLYSILOXANE DISPERSING AGENT

The invention relates to the use of a polysiloxane having a plurality of siloxane groups as a dispersing agent for solid particles in a non-aqueous composition, and to a non-aqueous composition comprising a polysiloxane having a plurality of siloxane groups, a dispersion medium, and solid particles. The invention further relates to a process for dispersing solid particles in a non-aqueous composition.

A large number and variety of substances can be used as dispersants for pigments and fillers. Alongside simple compounds with a low molecular mass, such as fatty acids and their salts or various silanes such as alkyl or vinyl silanes, for example, complex structures are also used.

EP 0931537 B1 describes the dispersion of organic and inorganic powders in oil containing compositions by means of polysiloxane-containing compounds. The polymers are prepared by radical copolymerization of vinylic polysiloxane macromonomers with other vinylic monomers, the other vinylic monomers containing a nitrogen-containing group, a polyoxyalkylene group, an anionic group, or a polylactone group.

U.S. Pat. No. 9,217,083 B2 describes a copolymer which contains at least one polysiloxane group and the skeletal structure of which is an addition compound of at least one amine and at least one epoxide. The invention further relates to the use of said products as dispersing agent for organic and inorganic pigments and fillers in oil-based compositions, and especially in silicone containing compositions.

U.S. Pat. No. 7,329,706 B2 describes a heat-conductive silicone composition comprising an organopolysiloxanes, a heat-conductive filler, and a specific polysiloxane macromonomer bearing alkoxysilane groups as dispersant.

EP 2107078 A1 describes the reaction of a of an Si—H functional polysiloxane with ally succinic anhydride to prepare an anhydride functional polysiloxane. The anhydride functional polysiloxane is subsequently hydrolyzed to form a dicarboxylic acid functional polysiloxane. Titanium dioxide powder and zinc oxide are treated with this material.

JP 2020/059771 A describes a dispersant having a silicone structure and a dicarboxylic acid anhydride structure at one end of the silicone structure. The dispersant is used to treat zirconia, which is subsequently dispersed in silicone oil.

While the prior-art dispersants provide an acceptable stability of dispersed pigments and/or fillers, there remains a demand for improved systems, for lowering the sedimentation of pigments, enhancing the color faithfulness of pigment dispersions, reducing the viscosity and ensuring a broader compatibility of dispersants with regard to different compositions—such as, for example, compatibility with very apolar compositions, such as oil-based and silicone-based compositions.

Silicone containing compositions can be non-curable or curable compositions, such as condensation or addition curing. In the case of addition curing, the composition consists of 2 parts, SiH- and vinyl-functional organopolysiloxane components, and typically a Platinum based catalyst is used. If the composition further contains functional filler(s) or pigment(s), a dispersing agent is generally used to compatibilise the filler(s) or pigment(s) and the silicone. Known dispersing agents have been found insufficient to fully disperse the filler(s) or pigment(s). In particular, it was not possible to achieve a sufficiently low viscosity of the composition and at the same time not having a negative influence on the curing process.

In the field of modern electronic devices heat management plays a constant growing role. Without thermal conductive materials the advances in microelectronics technology wouldn't have resulted in electronic devices that process signals and data at unprecedented high speeds. Electronic and/or integrated circuit ("IC") devices, e.g., microprocessors, memory devices, printed circuit, etc, become smaller while heat dissipation requirements get larger.

To realize high thermal conductivity in potting materials, gaskets, solder pasts, underfills, thermal interface materials as (e.g. thermal gap fillers, gap pads, sil pads, phase change materials, thermal conductive grease, thermal gel, Thermal Clad materials, thermal encapsulants), adhesives, sealants and coatings, high thermal conductive particles loadings are needed. The significant drawback of those highly filled systems is that high filler loadings increase the conductive material viscosity to undesirably high levels and impair the application properties substantially.

The present invention seeks to solve or alleviate the above-mentioned drawbacks by combining an efficient dispersing effect and curing speed.

The invention relates to the use of a polysiloxane having a plurality of siloxane groups and at least one cyclic carboxylic anhydride group or the hydrolysis product thereof covalently linked to the polysiloxane, as a dispersing agent for solid filler particles in a non-aqueous composition comprising a dispersion medium, wherein the content of the filler particles is in the range of from 500 to 2500 parts by weight per 100 parts by weight of the dispersion medium.

The above-mentioned use may also be described as a process of dispersing a pigment/filler in a non-aqueous composition comprising the step of adding a polysiloxane having a plurality of siloxane groups and at least one cyclic carboxylic anhydride group or the hydrolysis product thereof covalently linked to the polysiloxane to a non-aqueous composition comprising solid particles, followed by dispersing the solid particles in the non-aqueous composition. The liquid composition may be used as such or further be reacted with a crosslinker to obtain a cured composition. In such a case, there are no limitations concerning the cure mechanism of the liquid composition, which can be based, for instance, on a hydrosilylation reaction, condensation reaction, addition reaction or an organic peroxide-induced free radical reaction.

A non-aqueous composition is a composition wherein the content of water is below 10% by weight, preferably below 5% by weight, calculated on the weight of the composition. In some embodiments, the non-aqueous composition is free or essentially free of water.

It has been found that the use of a polysiloxane having a plurality of siloxane groups and at least one cyclic carboxylic anhydride group or the hydrolysis product thereof covalently linked to the polysiloxane, as a dispersant in a composition comprising solid particles provides improved dispersing properties. When used in potting materials, gaskets, solder pastes, underfills, thermal interface materials such as thermal gap fillers, gap pads, sil pads, phase change materials, thermal conductive grease, thermal gel, thermal clad materials, thermal encapsulants, adhesives, sealants and coatings compositions, it is possible to reduce the viscosity.

The use of the non-aqueous composition as a thermal interface material is preferred, in particular as a thermal interface material in an electronic component.

As mentioned above, the polysiloxane has at least one cyclic carboxylic anhydride group or the hydrolysis product thereof covalently linked to the polysiloxane. The hydrolysis product of a cyclic carboxylic anhydride is the corresponding dicarboxylic acid or a salt thereof. Suitable examples of cyclic carboxylic anhydride groups are those derived from bicyclo[2.2.1]hept-5-ene-2,3-dicarboxylic anhydride, 5-norbornene-2,3-carboxylic anhydride, 1-cyclopentene-1,2-dicarboxylic anhydride, maleic anhydride, tetrahydrophthalic anhydride, citraconic anhydride, itaconic anhydride, allyl succinic anhydride. In some embodiments, the cyclic carboxylic anhydride group is present in the form of a 5-membered ring. In a further embodiment, the at least one cyclic carboxylic anhydride group is derived from allyl succinic anhydride. In another embodiment, the cyclic carboxylic anhydride group is present as a 6-membered ring. If the polysiloxane has two or more cyclic carboxylic anhydride groups covalently linked to it, the individual anhydride groups may be of the same or of different types. In some embodiments, the polysiloxane has more than two cyclic carboxylic anhydride groups or the hydrolysis product thereof covalently linked to it. In other further embodiment, the polysiloxane has two cyclic carboxylic anhydride groups linked to it. In a still further embodiment, the polysiloxane has one cyclic carboxylic anhydride group or the hydrolysis product thereof linked to it. However, it is also possible to use a mixture of polysiloxanes, for example of a first polysiloxane having one or more cyclic carboxylic anhydride groups or the hydrolysis product thereof linked to it, and a second different polysiloxane having one or more cyclic carboxylic anhydride groups or the hydrolysis product thereof linked to it.

The cyclic carboxylic anhydride groups or the hydrolysis products thereof may be positioned along the polysiloxane chain at various positions. In some embodiments, the at least one anhydride group is covalently linked to the polysiloxane as a terminal group at the two ends of a polysiloxane chain. A polymer morphology wherein two anhydride groups are located at the two ends of polysiloxane chain may also be referred to as ABA polymer. In further embodiments, the at least one anhydride group is covalently linked to the polysiloxane as a terminal group at the one end only of a polysiloxane chain. A polymer morphology wherein only anhydride groups is located at one end only of a polysiloxane chain may also be referred to as macromonomer. Alternatively, or additionally, the at least one anhydride group is covalently linked to the polysiloxane at a non-terminal position. A polymer morphology wherein several anhydride groups are pending from a polysiloxane chain at different positions may also be referred to as a comb polymer.

The polysiloxane having a plurality of siloxane groups generally has 1 to 15 cyclic carboxylic anhydride groups or the hydrolysis products thereof covalently linked to it. In a preferred embodiment, 1 to 10, and more preferred 1 to 2 cyclic carboxylic anhydride groups or the hydrolysis products thereof are covalently linked to the polysiloxane. In some embodiments, a mixture of polysiloxanes having different numbers of cyclic carboxylic anhydride groups or the hydrolysis products thereof can be employed. If such mixtures are employed, the number of cyclic carboxylic anhydride groups or the hydrolysis products thereof relates to the average number of cyclic carboxylic anhydride groups or the hydrolysis products thereof. In a preferred embodiment on average 0.7 to 3.0 cyclic carboxylic anhydride groups or the hydrolysis product thereof are covalently linked to a polysiloxane molecule.

The polysiloxane having a plurality of siloxane groups and at least one cyclic carboxylic anhydride group or the hydrolysis product thereof covalently linked to the polysiloxane can be prepared according to known methods. In preferred embodiments, the cyclic carboxylic anhydride group or the hydrolysis product thereof is linked to the polysiloxane via a Si—C bond.

In one embodiment, the compounds in question are prepared by a hydrosilylation reaction, wherein a polysiloxane having a plurality of siloxane groups and at least one Si—H group is reacted with an anhydride compound having an ethylenically unsaturated group. Such reactions are generally catalyzed by metal-based catalysts. Details of such hydrosilylation reactions and suitable conditions are generally known.

Hydrosilylation catalysts employed are preferably noble metals and their compounds, such as platinum, rhodium, and palladium and their compounds, more preferably platinum compounds. Especially preferred platinum compounds are hexachloroplatinic acid, alcoholic solutions of hexachloroplatinic acid, complexes with platinum and aliphatic, unsaturated hydrocarbon compounds; and platinum-vinylsiloxane complexes. It is also possible, however, to use platinum black and platinum on activated carbon. If, for example, a platinum compound is used, 1 to 50 ppm as platinum metal are preferably used.

The progress of the hydrosilylation reaction may be monitored by gas-volumetric determination of the remaining SiH groups or by infrared spectroscopy (absorption band of the silicon hydride at 2150 $cm^{-1}$). The polysiloxanes of the invention preferably contain no residual Si—H groups.

When the polysiloxane having a plurality of siloxane groups and at least one cyclic carboxylic anhydride groups or the hydrolysis products thereof covalently linked to the polysiloxane is prepared by a hydrosilylation reaction of an ethylenically unsaturated anhydride, a covalent link between the polysiloxane and the at least one anhydride group is formed. One specific example of ethylenically unsaturated anhydride which is suitable for the preparation of polysiloxanes used according to the invention is allyl succinic anhydride.

The synthetic route described above requires a polysiloxane having a plurality of siloxane groups and at least one Si—H group as starting material. Suitable polysiloxane having at least one Si—H group can be represented by the following general formula (I)

$$M_aM'_bD_cD'_dT_eQ_f \quad \text{(I)}$$

wherein

M represents $[R_3SiO_{1/2}]$

M' represents $[R_2SiHO_{1/2}]$

D represents $[R_2SiO_{2/2}]$

D' represents $[RSiHO_{2/2}]$

T represents $[RSiO_{3/2}]$

Q represents $SiO_{4/2}]$ a is an integer of 0 to 10, preferably 0 to 1, more preferably 1, b is an integer of 0 to 10, preferably 1 to 2, more preferably 1, c is an integer of 0 to 500, preferably 2 to 300, more particularly 5 to 250, d is an integer of 0 to 100, preferably 0 to 50, more particularly 0 to 30, e is an integer of 0 to 10, preferably 0 to 5, more particularly 0, f is an integer of 0 to 10, preferably 0 to 5, more particularly 0, with the proviso that $a+b\geq 2$ and $b+d\geq 1$ R independent of each other represents a $C_1$ to $C_{30}$ hydrocarbon radical, preferably methyl, octyl or phenyl, (α-methyl)styryl, more preferably methyl.

The description of polysiloxanes using M, D, T and Q units is generally known in the art.

Generally, the polysiloxane having SiH groups are synthesized using the classic equilibration reaction known in the prior art.

Generally, the polysiloxane has 1 to 15 SiH groups, preferably 1 to 10, and more preferably 1 to 2 SiH groups. Generally, the polysiloxane has 4 to 70 Silicon atoms, preferably 10 to 50 silicon atoms.

If so desired, the polysiloxane having a plurality of siloxane groups and two anhydride group covalently linked to the polysiloxane can be prepared by other suitable synthetic routes, for example by equilibration reactions of anhydride-functional polysiloxane of ABA structure, such as described in EP 0 112 845 B1, in particular Example 4 of this document.

The number average molecular weight of the polysiloxane having a plurality of siloxane groups and at least one anhydride group covalently linked to the polysiloxane generally is within the range of 300 to 15000 g/mol, preferably 500 to 10000 g/mol, and even more preferably 800 to 8000 g/mol.

The number average molecular weight can be determined by gel permeation chromatography carried out at 22° C. using a separation module Waters 2695 and a refractive index detector Waters 2414. Toluene is a suitable eluent, using polydimethylsiloxane standards for calibration.

Optionally, the polysiloxane having a plurality of siloxane groups and at least one anhydride group covalently linked to the polysiloxane can have additional structural segments. Such optional segments may be included to adjust and fine-tune the compatibility with the systems wherein they are employed, and other properties of the polysiloxane. Examples of such optional segments are polyether segments, for example based on polyethylene oxide and/or polypropylene oxide, polyester segments, hydrocarbon segments, fluorinated hydrocarbon segments, and polyurethane segments. These optional segments may be connected to the polysiloxane backbone by hydrosilylation or dehydrogenative condensation. Such dehydrogenative condensation reactions are suitably catalyzed by metal complexes. This reaction type is described in German patent application DE 102005051939 A. These optional segments are preferentially connected to the polysiloxane backbone by hydrosilylation.

In many embodiments the polysiloxane having a plurality of siloxane groups and at least one anhydride group covalently linked to the polysiloxane is a liquid at room temperature. It can be used according to the invention and included in liquid compositions as such as 100% active substance. If so desired, the polysiloxane can also be diluted with an organic solvent or an oil or a silicone prior to including it in a liquid composition. In a still further embodiment, the polysiloxane can be included in the liquid composition as emulsion or dispersion. The liquid composition preferably contains the polysiloxane in an amount to achieve effective dispersing properties. The specific amount depends on the content of solid particles, such as pigments and/or fillers in the composition and the degree of dispersion which is required. Generally, the liquid composition contains the polysiloxane in an amount of from 0.001 to 10.000 wt.-%, preferably of from 0.010 to 8.000 wt.-%, more preferably of from 0.050 to 7.000 wt.-% or of from 0.060 to 6.000 wt.-% or of from 0.080 to 5.000 wt.-%, in particular of from 0.100 to 2.000 wt.-%, based in each case on the total weight of the composition.

The dispersions of pigment and/or filler in accordance with the present invention can be used in a wide range of formulations, including resins, oils, greases, lubricants, rubber materials, potting materials, gaskets, solder pasts, underfills, thermal interface materials as (e.g. thermal gap fillers, gap pads, sil pads, phase change materials, thermal conductive grease, thermal gel, Thermal Clad materials, thermal encapsulants), adhesives, sealants, coatings, waxes, or material compositions. The dispersions may also be used in formulations which are produced in the body care industry, or in electrical applications in the electronics industry, in the marine industry, for medical applications, in the construction industry, or in the electronic, battery and automotive industry. Examples include cosmetic products, electronic paper, such as, for example, the display in E-books, the encapsulation of microelectronic chips, submarine skin coatings, such as, for example, antifouling coatings, silicone tubes, or lubricity additives for brake components.

The dispersions are particularly suitable for use in Thermally Interface Materials (TIM) products. These materials are used as interfaces between devices or parts thereof to dissipate heat from these devices (e.g., microprocessors). One typical TIM typically includes a polymer matrix and one or more thermally conductive filler(s). The TIM technologies used for electronic devices encompass several classes of materials such as epoxies, greases, sheets, pads, phase change materials, filled polymer matrices such as elastomers, gels, carbon-based materials, adhesives. U.S. Pat. No. 6,469,379 describes a silicone based TIM including a vinyl terminated Silicon polymer; a silicone cross-linker having terminal Silicon-hydride units, a chain extender, and a thermally conductive filler, such as a metal (e.g., Aluminum, Silver, etc.) and/or a ceramic (e.g., aluminum nitride, aluminum oxide, zinc oxide, etc.).

The use of the non-aqueous composition as a thermal interface material is preferred, in particular as a thermal interface material in an electronic component.

One aspect of the present invention relates to a process for producing a dispersion, said process comprising the mixing of at least one pigment and/or filler in a vehicle selected from the group consisting of at least one silicone oil and or silicone rubber material, with the aid of at least one anhydride modified polysiloxane of the invention. These dispersions represent preferably pigment preparations and/or filler preparations, which are used preferably for various compositions.

In a further embodiment, the dry filler is treated with a polysiloxane having a plurality of siloxane groups and at least one cyclic carboxylic anhydride group or the hydrolysis product thereof covalently linked to the polysiloxane to modify the surface of the dry filler, followed by mixing the treated filler with a dispersion medium.

In a preferred embodiment, the non-aqueous composition comprises a dispersion medium which is different from the polysiloxane having a plurality of siloxane groups and at least one cyclic carboxylic anhydride group or the hydrolysis product thereof.

In a further preferred embodiment, the dispersion medium comprises a silicone. In some embodiments, the silicone is a silicone oil or silicone rubber.

Examples of silicone oils include those of the following structures:

(II)

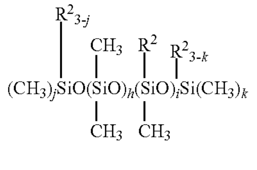

-continued (III)

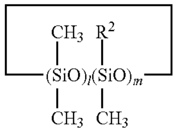

(IV)

$R^3_{4-z}Si(OSi(CH_3)_3)_z$ where $R^2$ is selected from the group consisting of hydrogen, a hydroxyl group, alkyl or fluorinated alkyl groups having 2 to 20 carbon atoms, aryl groups, aminoalkyl groups, $C_{6-22}$ alkoxy groups, and a group of the formula $(CH_3)_3SiO[(CH_3)_2SiO]ySi(CH_3)_2CH_2CH_2$—, in which y is an integer from 0 to 500. $R^3$ is a $C_{1-20}$ alkyl group. In formula (II), h is an integer from 0 to 1000, i is an integer from 0 to 1000, with the proviso that h+i is 1 to 2000, and each j and k independently of one another is 0, 1, 2, or 3. In formula (III) I and m are integers from 0 to 8, with l+m ranging from 3 to 8, and in formula (IV), z is an integer from 1 to 4. Examples of the radical $R^2$ include methyl, ethyl, propyl, butyl, hexyl, octyl, decyl, dodecyl, tetradecyl, hexadecyl, octadecyl, trifluoropropyl, nonafluorohexyl, heptadecylfluorodecyl, phenyl, aminopropyl, dimethylaminopropyl, aminoethylaminopropyl, stearoxy, butoxy, ethoxy, propoxy, cetyloxy, myristyloxy, styryl, and alpha-methylstylyl, among which preference is given to hexyl, octyl, decyl, dodecyl, tetradecyl, hexadecyl, octadecyl, trifluoropropyl, phenyl, aminopropyl, and aminoethylaminopropyl. Examples of the silicone oil include organopolysiloxanes with low or high viscosity, such as dimethylpolysiloxane, methylphenylpolysiloxane, methyl-hydrogenpolysiloxane, and dimethyl siloxane-methyl-phenylsiloxane copolymer, for example; cyclosiloxanes, such as octamethylcyclotetrasiloxane (D4), decamethyl-cyclopentasiloxane (D5), dodecamethylcyclohexasiloxane (D6), tetramethyltetrahydrogencyclotetrasiloxane (H4), and tetramethyltetraphenylcyclotetrasiloxane; tris-trimethylsiloxysilane (M3T), tetrakistrimethylsiloxysilane (M4Q); branched siloxanes, such as tristrimethylsiloxypropylsilane, tristrimethylsiloxy-butylsilane, tristrimethylsiloxyhexylsilane, and tristrimethylsiloxyphenylsilane, for example; higher alcohol-modified silicones, such as steroxysilicone; alkyl-modified silicones, amino-modified silicones, and fluoro-modified silicones.

In some embodiments, the silicone dispersion medium is a crosslinkable silicone. The crosslinkable silicones may be present in a multiplicity of forms and compounds, such as, for example, as silicone oils, silicone with high solids, water-based silicones, silicon alkyds, siliconized polyesters, or siliconized acrylic resins. Crosslinking may take place by moisture curing, hydrosilylation curing, radiation curing, free-radical induced curing, or a combination of radiation and thermal curing (dual cure). Crosslinkable silicones are also referred to as silicone rubbers or liquid silicone rubbers.

Methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, and other linear alkyl groups; isopropyl, tertiary butyl, isobutyl, 2-methyl undecyl, 1-hexylheptyl, and other branched alkyl groups; cyclopentyl, cyclohexyl, cyclododecyl, and other cyclic alkyl groups; vinyl, allyl, butenyl, pentenyl, hexenyl, and other alkenyl groups; phenyl, tolyl, xylyl, and other aryl groups; benzyl, phenethyl, 2-(2,4,6-trimethylphenyl)propyl, and other aralkyl groups; 3,3,3-trifluoropropyl, 3-chloropropyl, and other halogenated alkyl groups are suggested as the silicon-bonded groups of the organopolysiloxane. Preferably, such groups are alkyl, alkenyl, or aryl groups, and especially preferably, methyl, vinyl, or phenyl. In addition, there are no limitations on the viscosity of the organopolysiloxane at 25° C. However, the viscosity is preferably within the range of from 20 to 100,000 mPa·s, more preferably, within the range of from 50 to 100,000 mPa·s, still more preferably, within the range of from 50 to 50,000 mPa·s, and especially preferably, within the range of from 100 to 50,000 mPa·s. This is due to the fact that when its viscosity at 25° C. is less than the lower limit of the above-mentioned range, the physical properties of the resultant silicone compositions tend to decrease, and, on the other hand, when it exceeds the upper limit of the above-mentioned range, the handleability of the resultant silicone compositions tends to decrease. There are no limitations concerning the molecular structure of such an organopolysiloxane, which may be, for instance, linear, branched, partially branched linear, or dendritic (dendrimeric), and is preferably linear or partially branched linear. Examples of such organopolysiloxanes include, for instance, homopolymers possessing the above-mentioned molecular structures, copolymers having the above-mentioned molecular structures, or mixtures of the above-mentioned polymers. Dimethylpolysiloxane having both terminal ends of its molecular chain blocked by dimethylvinylsiloxy groups, dimethylpolysiloxane having both terminal ends of its molecular chain blocked by methylphenylvinylsiloxy groups, dimethylsiloxane-methylphenyl siloxane copolymer having both terminal ends of its molecular chain blocked by dimethylvinylsiloxy groups, dimethylsiloxane-methylvinylsiloxane copolymer having both terminal ends of its molecular chain blocked by dimethylvinylsiloxy groups, dimethylsiloxane-methylvinylsiloxane copolymer having both terminal ends of its molecular chain blocked by trimethylsiloxy groups, methyl(3,3,3-trifluoropropyl)-polysiloxane having both terminal ends of its molecular chain blocked by dimethylvinylsiloxy groups, dimethylsiloxane-methylvinylsiloxane copolymer having both terminal ends of its molecular chain blocked by silanol groups, dimethylsiloxane-methylvinylsiloxane-methylphenylsiloxane copolymer having both terminal ends of its molecular chain blocked by silanol groups, organosiloxane copolymer consisting of siloxane units represented by the formula $(CH_3)_3SiO_{1/2}$, siloxane units represented by the formula $(CH_3)_2(CH_2{=}CH)SiO_{1/2}$, siloxane units represented by the formula $CH_3SiO_{3/2}$, and siloxane units represented by the formula $(CH_3)_2SiO_{2/2}$, dimethylpolysiloxane having both terminal ends of its molecular chain blocked by silanol groups, dimethylsiloxane-methylphenyl siloxane copolymer having both terminal ends of its molecular chain blocked by silanol groups, dimethylpolysiloxane having both terminal ends of its molecular chain blocked by trimethoxysiloxy groups, dimethylsiloxane-methylphenylsiloxane copolymer having both terminal ends of its molecular chain blocked by trimethoxysilyl groups, dimethylpolysiloxane having both terminal ends of its molecular chain blocked by methyldimethoxysiloxy groups, dimethylpolysiloxane having both terminal ends of its molecular chain blocked by triethoxysiloxy groups, dimethylpolysiloxane having both terminal ends of its molecular chain blocked by trimethoxysilylethyl) groups, and mixtures of two or more of the above-mentioned compounds are suggested as examples of such organopolysiloxanes.

When the composition is cured by means of a hydrosilation reaction, the dispersion medium is preferably an organopolysiloxane having an average of not less than 0.1 silicon-bonded alkenyl groups per molecule. More preferably, it is an organopolysiloxane having an average of not less than 0.5 silicon-bonded alkenyl groups per molecule, and especially preferably, it is an organopolysiloxane having an average of not less than 0.8 silicon-bonded alkenyl groups per molecule. This is due to the fact that when the average number of silicon-bonded alkenyl groups per molecule is less than the lower limit of the above-mentioned range, the resultant compositions tend to fail to cure to a sufficient extent. The silicon-bonded alkenyl groups of the organopolysiloxane are exemplified by the same alkenyl groups as those mentioned above and are preferably represented by vinyl. In addition, silicon-bonded groups other than the alkenyl groups in the organopolysiloxane are exemplified by the same linear alkyl, branched alkyl, cyclic alkyl, aryl, aralkyl, halogenated alkyl groups as those mentioned above. They are preferably represented by alkyl and aryl groups, and especially preferably, by methyl and phenyl. There are no limitations concerning the molecular structure of such organopolysiloxanes, which is exemplified by the same structures as those mentioned above, and is preferably linear or linear with partial branching. Such organopolysiloxanes are exemplified, for instance, by homopolymers having the above-mentioned molecular structures, copolymers having the above-mentioned molecular structures, or mixtures of these polymers. Such organopolysiloxanes are exemplified by organopolysiloxanes having the same alkenyl groups as those mentioned above.

When the composition is cured by means of a condensation reaction, the dispersion medium is an organopolysiloxane having at least two silanol groups or silicon-bonded hydrolyzable groups per molecule. Examples of the silicon-bonded hydrolyzable groups in the organopolysiloxane include, for instance, methoxy, ethoxy, propoxy, and other alkoxy groups; vinyloxy, propenoxy, isopropenoxy, 1-ethyl-2-methylvinyloxy, and other alkenoxy groups; methoxyethoxy, ethoxyethoxy, methoxypropoxy, and other alkoxyalkoxy groups; acetoxy, octanoyloxy, and other acyloxy groups; dimethylketoxime, methylethylketoxime, and other ketoxime groups; dimethylamino, diethylamino, butylamino, and other amino groups; dimethylaminoxy, diethylaminoxy, and other aminoxy groups; N-methylacetamido groups, N-ethylacetamido, and other amido groups. In addition, the silanol groups and silicon-bonded hydrolyzable groups of the organopolysiloxane are exemplified by the same linear alkyl, branched alkyl, cyclic alkyl, alkenyl, aryl, aralkyl, and halogenated alkyl groups as those mentioned above. There are no limitations concerning the molecular structure of such organopolysiloxanes, which is exemplified by the same structures as those mentioned above and is preferably linear or partially branched linear. Such organopolysiloxanes are exemplified by organopolysiloxanes having at least two silanol groups or silicon-bonded hydrolyzable groups per molecule, said groups being the same as those mentioned above.

When the composition is cured by means of an organic peroxide-induced free radical reaction, there are no limitations concerning the organopolysiloxane of the dispersion medium. However, it is preferably an organopolysiloxane having at least one silicon-bonded alkenyl group. Silicon-bonded groups in such an organopolysiloxane are exemplified by the same linear alkyl, branched alkyl, cyclic alkyl, alkenyl, aryl, aralkyl, and halogenated alkyl groups as those mentioned above and are preferably alkyl, alkenyl, or aryl groups, with methyl, vinyl, and phenyl being particularly preferable. There are no limitations concerning the molecular structure of such an organopolysiloxane, which is exemplified by the same structures as those mentioned above and is preferably linear or partially branched linear. Such organopolysiloxanes are exemplified, for instance, by homopolymers having the above-mentioned molecular structures, copolymers having the above-mentioned molecular structures, or mixtures of the above-mentioned polymers. Such organopolysiloxanes are exemplified by the same organopolysiloxanes as those mentioned above.

Silicone rubbers may be categorized as room temperature vulcanizing (RTV) silicone rubbers or as high temperature vulcanizing (HTV) silicone rubbers. They are generally known and described, for example, in U.S. Pat. No. 6,172,150 B1, WO 2018051158 A1, WO 2003078527 A1, U.S. Pat. No. 6,194,508 B1, and WO 2003057782 A1. Liquid silicone rubbers are further described in WO 2015003978 A1, WO 2018051158 A1, and WO 2020223864 A1.

Suitable crosslinkable silicones are commercially available, for example under the trade designation ELSATOSIL® and SEMICOSIL® from Wacker Chemie AG.

As mentioned above, the polysiloxane having a plurality of siloxane groups and at least one cyclic carboxylic anhydride group or the hydrolysis product thereof covalently linked to the polysiloxane is used as a dispersing agent for solid particles in a non-aqueous composition. Examples of solid particles include pigments and fillers.

The solid particles may be surface-modified, wherein the surfaces may have, for example, hydrophilic, amphiphilic or hydrophobic compounds or groups. The surface treatment may consist in providing the pigments with a thin hydrophilic and/or hydrophobic inorganic or organic layer by methods known to the person skilled in the art.

In preferred embodiments, the average particle size of solid particles is in the range of 0.1 to 500.0 μm, preferably 0.1 to 100 μm.

The average particle size relates to the $D_{50}$ mass average particle size determined by laser diffraction analysis according to ISO 13320:2009-10.

In further preferred embodiments, the solid particles comprise aluminum oxide particles. It is particularly preferred that the aluminum oxide particles comprise at least one of spherical aluminum oxide particles having an average particle size in the range of 1.0 to 50.0 μm and irregular-shaped aluminum oxide particles having an average particle size in the range of 0.1 to 50.0 μm.

Pigments include inorganic and organic pigments, pigment blacks, effect pigments such as, for example, pearlescent and/or metal effect pigments, glitter pigments and mixtures thereof.

Suitable organic pigments include for example nitroso, nitro, azo, xanthene, quinoline, anthraquinone, phthalocyanine, metal complex, isoindolinone, isoindoline, quinacridone, perinone, perylene, diketopyrrolopyrrole, thioindigo, Dioxazine, triphenylmethane and quinophthalone compounds. Furthermore, the organic pigments can be selected, for example, from: carmine, carbon black, aniline black, azo yellowb, quinacridone, phthalocyanine blue. Examples of these are: D & C Red (Cl 45), D & C Orange (Cl 45), D & C Red 3 (Cl 45530), D & C Red 7 (Cl 15 850), D & C Red 4 (Cl 15 510), D & C Red 33 (Cl 17 200), D & C Red 34 (Cl 15 880), D & C Yellow 5 (Cl 19 140), 0 & C Yellow 6 (Cl 15 985), D & C Green (Cl 61 570), D & C Yellow 10 (Cl 77 002), D & C Green 3 (Cl 42 053) and/or D & C Blue 1 (Cl 42 090).

Suitable inorganic pigments comprise, for example, metal oxides or other metal compounds which are sparingly soluble or at least substantially insoluble in water, in particular oxides of titanium, for example titanium dioxide (Cl 77891), zinc, iron, for example red and black iron oxide (Cl 77491 (red), 77499 (black)), Or iron oxide hydrate (Cl 77492, yellow), zirconium, silicon, manganese, aluminum, cerium, chromium and mixed oxides of the elements mentioned and mixtures thereof. Further suitable pigments are barium sulfate, zinc sulfide, manganese violet, Ultramarin blue and Berlin blue pigments.

With regard to pearlescent pigments, for example, the following types or types of pearlescent pigments can be used:

Natural pearlescent pigments such as, for example, "fish silver" (guanine/hypoxanthine mixed crystals from fish scales) and "mother-of-pearl" (ground mussel shells)

Monocrystalline pearlescent pigments such as, for example, bismuth oxychloride (BiOCl) or platelet-shaped titanium dioxide, and Layer substrate pearlescent pigments.

Suitable platelet-shaped transparent substrates to be coated for the layer-substrate pearlescent pigments are non-metallic, natural or synthetic platelet-shaped substrates. The substrates are preferably essentially transparent, preferably transparent, i.e. at least partially transparent to visible light.

The platelet-shaped transparent substrates can be selected from the group consisting of natural mica, synthetic mica, glass flakes, $SiO_2$ platelets, $Al_2O_3$, Kaolin, graphite, talc, polymer platelets, platelet-shaped bismuth oxychloride, platelet-shaped substrates comprising an inorganic-organic mixed layer, and mixtures thereof.

In addition to pearl luster pigments, metal effect pigments can also be used in the context of the present invention.

The platelet-shaped metal substrate can in this case consist, in particular, of a pure metal and/or of a metal alloy. The metal substrate may preferably be selected from the group consisting of silver, aluminum, iron, chromium, nickel, molybdenum, gold, copper, zinc, tin, stainless steel, magnesium, steel, bronze, brass, titanium and their alloys.

In a further embodiment, the solid particles include fillers. All kind of fillers known in the art can be used. Particularly functional fillers are used in the compositions. Thermally conductive materials help remove heat from the component and contain thermally conductive filler(s) as functional filler(s). The filler material comprises a solid material with a thermal conductivity greater than that of the matrix material. Suitable filler materials for use in embodiments of the present invention include, for instance aluminum powder, copper powder, nickel powder, or other metal powders; alumina powder, magnesia powder, beryllia powder, chromia powder, precipitated silica, fumed silica, titania powder, or other metal oxide powders; boron nitride powder, aluminum nitride powder, or other metal nitride powders; born carbide powder, titanium carbide powder, silicon carbide powder, or other metal carbide powders; powders of Fe—Si alloys, Fe—Al alloys, Fe—Si—Al alloys, Fe—Si—Cr alloys, Fe—Ni alloys, Fe—Ni—Co alloys, Fe—Ni—Mo alloys, Fe—Co alloys, Fe—Si—Al—Cr alloys, Fe—Si—B alloys, Fe—Si—Co—B alloys; and other soft magnetic alloy powders; Mn—Zn ferrite, Mn—Mg—Zn ferrite, Mg—Cu—Zn ferrite, Ni—Zn ferrite, Ni—Cu—Zn ferrite, Cu—Zn ferrite, or other ferrites, and mixtures of two or more of the above-mentioned materials in addition, the shape of the fillers can be, for instance, spherical, acicular, disk-like, rod-like, oblate, or irregular. When electrical insulation properties are required of the present composition, or the resultant cured silicone product obtained by curing the present composition, the filler is preferably a metal oxide powder, metal nitride powder, or metal carbide powder, especially preferably, an alumina powder. There are no limitations concerning the average particle size of the filler, which is preferably in the range of from 0.1 to 500 μm, and especially preferably, in the range of from 0.1 to 100 μm. When aluminum oxide particles are used as a thermally conductive filler, it is preferably a mixture of (B1) spherical aluminum oxide particles with an average particle size in the range of 1 to 50 μm and (B2) a spherical or irregular-shaped aluminum oxide particles with an average particle size of 0.1 to 50 μm. Furthermore, in such a mixture, the content of the above-mentioned component (B1) is preferably in the range of from 30 to 90 wt % and the content of the above-mentioned component (B2) is preferably in the range of from 10 to 70 wt % calculated on sum components (1) and (B2). In the composition, there are no limitations concerning the content of the filler. However, in order to form a silicone composition of excellent thermal conductivity, its content in the composition in vol % preferably is at least 30 vol %, more preferably, in the range of from 30 to 90 vol %, still more preferably, in the range of from 60 to 90 vol %, and especially preferably, in the range of from 80 to 90 vol %. To form a silicone composition of excellent thermal conductivity, the content of the filler in wt % in the composition preferably is at least 50 wt %, more preferably, in the range of from 70 to 98 wt %, and especially preferably, in the range of from 90 to 97 wt %. The fillers may have different particle sizes and may be present not only individually but also in a mixture and, furthermore, may have been mutually coated with one another.

Specifically, the content of the filler is in the range of from 500 to 2500 parts by weight, more preferably, in the range of from 500 to 2000 parts by weight, and especially preferably, in the range of from 800 to 2000 parts by weight per 100 parts by weight of dispersion medium. This is due to the fact that when the content of the filler is less than the lower limit of the above-mentioned range, the thermal conductivity of the resultant silicone compositions tends to decrease, and, on the other hand, when it exceeds the upper limit of the above-mentioned range, the viscosity of the resultant silicone compositions increases, and their handleability tends to deteriorate.

The composition may further comprise a curing agent, which makes it possible to produce a curable composition. When the composition is cured by means of a hydrosilation reaction, the curing agent is made up of a platinum catalyst and an organopolysiloxane having an average of at least 2 silicon-bonded hydrogen atoms per molecule. The groups bonded to silicon atoms in the organopolysiloxane are exemplified by the same linear alkyl, branched alkyl, cyclic alkyl, aryl, aralkyl, and halogenated alkyl groups as those mentioned above, preferably, by alkyl or aryl groups, and especially preferably, by methyl or phenyl. Suggested organopolysiloxanes include, for instance, dimethylpolysiloxane having both terminal ends of its molecular chain blocked by dimethylhydrogensiloxy groups, dimethylsiloxane-methylhydrogensiloxane copolymer having both terminal ends of its molecular chain blocked by trimethylsiloxy groups, dimethylsiloxane-methylhydrogensiloxane copolymer having both terminal ends of its molecular chain blocked by dimethylhydrogensiloxy groups, organosiloxane copolymer consisting of siloxane units of the formula: $(CH_3)_3\ SiO_{1/2}$, siloxane units of the formula: $(CH_3)_2\ HSiO_{1/2}$, and siloxane units of the formula: $SiO_{4/2}$, and mixtures of two or more of the above-mentioned compounds.

In the composition, the content of the organopolysiloxane having an average of at least 2 silicon-bonded hydrogen atoms per molecule is the content necessary to cure the composition. Specifically, it is preferably sufficient to provide between 0.1 mol and 10.0 mol, more preferably, between 0.1 mol and 5.0 mol, and especially preferably, between 0.1 mol to 3.0 mol of silicon-bonded hydrogen atoms from the component per 1 mol of silicon-bonded alkenyl groups of the dispersion medium. This is due to the fact that when the content of this component is less than the lower limit of the above-mentioned range, the resultant silicone composition tends to fail to completely cure, and, on the other hand, when it exceeds the upper limit of the above-mentioned range, the resultant cured silicone product is extremely hard and tends to develop numerous cracks on the surface. In addition, the platinum catalyst is a catalyst used to promote the curing of the present composition. Suggested examples of such catalysts include, for instance, chloroplatinic acid, alcohol solutions of chloroplatinic acid, olefin complexes of platinum, alkenylsiloxane complexes of platinum, and carbonyl complexes of platinum. In the composition, the content of platinum catalyst is the content necessary for curing the present composition. Specifically, it is sufficient to provide, in weight units, preferably between 0.01 ppm and 1,000 ppm, and particularly preferably between 0.1 ppm and 500 ppm of platinum metal from the component relative to the amount of dispersion medium. This is due to the fact that when the content of the component is less than the lower limit of the above-mentioned range, the resultant silicone composition tends to fail to completely cure, and, on the other hand, adding an amount exceeding the upper limit of the above-mentioned range does not significantly improve the cure rate of the resultant silicone composition.

When the composition is cured by means of a condensation reaction, curing agent is characterized by consisting of a silane having at least 2 silicon-bonded hydrolyzable groups per molecule or a partial hydrolyzate thereof, and, if needed, a condensation reaction catalyst. The silicon-bonded hydrolyzable groups in the silane are exemplified by the same alkoxy, alkoxyalkoxy, acyloxy, ketoxime, alkenyl, amino, aminoxy, and amido groups as those mentioned above. In addition to the above-mentioned hydrolyzable groups, examples of groups that can be bonded to the silicon atoms of the silane include, for instance, the same linear alkyl, branched alkyl, cyclic alkyl, alkenyl, aryl, aralkyl, and halogenated alkyl groups as those mentioned above. Suggested silanes or their partial hydrolyzates include, for instance, methyltriethoxysilane, vinyltriethoxysilane, vinyltriacetoxysilane, and ethyl orthosilicate.

In the composition, the content of the silane or its partial hydrolyzate is the content necessary to cure the present composition. Specifically, it is preferably in the range of from 0.01 to 20 parts by weight, and especially preferably, in the range of from 0.1 to 10 parts by weight per 100 parts by weight of the dispersion medium. This is due to the fact that when the content of the silane or its partial hydrolyzate is less than the lower limit of the above-mentioned range, the storage stability of the resultant composition deteriorates, and, in addition, its adhesive properties tend to decrease. On the other hand, when it exceeds the upper limit of the above-mentioned range, the cure of the resultant composition tends to slow down. In addition, the condensation reaction catalyst is an optional component which is not essential when using silanes having, for instance, aminoxy, amino, ketoxime, and other hydrolyzable groups as curing agents. Suggested condensation reaction catalysts include, for instance, tetrabutyl titanate, tetraisopropyl titanate, and other organic titanates; diisopropoxybis(acetylacetate)titanium, diisopropoxybis(ethylacetoacetate)titanium, and other chelate organotitanium compounds; aluminum tris(acetylacetonate), aluminum tris(ethylacetoacetate), and other organic aluminum compounds; zirconium tetra(acetylacetonate), zirconium tetrabutyrate, and other organic zirconium compounds; dibutyltin dioctoate, dibutyltin dilaurate, butyltin-2-ethylhexoate, and other organotin compounds; tin naphthenoate, tin oleate, tin butyrate, cobalt naphthenoate, zinc stearate, and other metal salts of organic carboxylic acids; hexylamine, dodecylamine phosphates and other amine compounds or their salts; benzyltriethylammonium acetate, and other quaternary ammonium salts; potassium acetate, lithium nitrate, and other lower fatty acid salts of alkali metals; dimethylhydroxylamine, diethylhydroxylamine, and other dialkylhydroxylamines; and guanidyl-containing organosilicon compounds. In the composition, the content of the condensation reaction catalyst is variable, and should be sufficient to cure the present composition. Specifically, it is preferably in the range of from 0.01 to 20.00 parts by weight, and especially preferably, in the range of from 0.1 to 10.0 parts by weight per 100 parts by weight of the dispersion medium. This is due to the fact that if the catalyst is essential, then a catalyst content smaller than the lower limit of the above-mentioned range tends to make it difficult for the resultant composition to cure completely, and, on the other hand, when the content exceeds the upper limit of the above-mentioned range, the storage stability of the resultant composition tends to decrease.

When the composition is cured by means of an organic peroxide-induced free radical reaction, the curing agent suitably is an organic peroxide. Suggested organic peroxides include, for instance, benzoyl peroxide, dicumyl peroxide, 2,5-dimethyl-bis(2,5-t-butylperoxy)hexane, dit-butyl peroxide, and t-butylperbenzoate. The content of the organic peroxides is the content necessary to cure the composition, specifically, it is preferably in the range of from 0.1 to 5.0 parts by weight per 100 parts by weight of the organopolysiloxane of the above-mentioned dispersion medium.

In particular, when the present composition is cured by means of a hydrosilation reaction, to adjust the cure rate of the present composition and improve its handleability, it is preferable to combine it with 2-methyl-3-butyn-2-ol, 2-phenyl-3-butyn-2-ol, 1-ethynyl-1-cyclohexanol, and other acetylene compounds; 3-methyl-3-penten-1-yne, 3,5-dimethyl-3-hexen-1-yne, and other ene-yne compounds; and, in addition, hydrazine compounds, phosphine compounds, mercaptan compounds, and other cure reaction inhibitors. There are no limitations concerning the content of the cure reaction inhibitors, however, preferably it is in the range of from 0.0001 to 1.0 wt % relative to the amount of the present composition. In case the present composition is curable, there are no limitations concerning the method of curing. The method, for instance, may involve molding the present composition and then allowing it to stand at room temperature, or molding the present composition and then heating it to 50 to 200° C. In addition, there are no limitations concerning the physical characteristics of the thus obtained silicone, but suggested forms include, for instance, gels, low-hardness rubbers, or high-hardness rubbers.

The invention further relates to a non-aqueous composition comprising a) a polysiloxane having a plurality of siloxane groups and at least one cyclic carboxylic anhydride group or the hydrolysis product thereof covalently linked to the polysiloxane, b) a dispersion medium, and c) solid filler particles, wherein the content of the filler particles is in the range of from 500 to 2500 parts by weight per 100 parts by weight of the dispersion medium.

In a preferred embodiment, the dispersion medium b) comprises a silicone which is different from the polysiloxane a).

It is particularly preferred that the dispersion medium b) is a crosslinkable silicone. The solid particles in the composition are preferably comprise at least one of fillers and pigments, as described above.

In a preferred embodiment of the composition, component a) is present in an amount of 0.010 to 10.000 percent by weight, calculated on the total weight of the composition.

In the composition, there are no limitations concerning the content of the polysiloxane a). The content should be sufficient to treat the surface of the above-described filler with the polysiloxane a) so as to improve its dispersibility in the resultant thermally conductive silicone composition, specifically, it is preferably in the range of from 0.001 to 10.000 parts by weight per 100 parts by weight of the filler and especially preferably, in the range of from 0.001 to 5 parts by weight per 100 parts by weight of the filler. This is due to the fact that when the content of the above-mentioned polysiloxane a) is less than the lower limit of the above-mentioned range, addition of large quantities of the filler leads to a decrease in the moldability of the resultant silicone composition as well as to the precipitation and separation of the filler during storage of the resultant silicone composition and to a marked drop in its consistency. On the other hand, when it exceeds the upper limit of the above-mentioned range, the physical properties of the resultant silicone composition tend to deteriorate.

In some embodiments, the composition is implemented as a paint or coating composition, as a molding composition, or as a paste or potting materials, gaskets, solder pasts, underfills, thermal interface materials such as thermal gap fillers, gap pads, sil pads, phase change materials, thermal conductive grease, thermal gel, Thermal Clad materials, thermal encapsulants, adhesives, sealants material.

If so desired, the composition may comprise other components, for example binders or polymeric resins, reactive or non-reactive diluents, solvents, as well as customary auxiliary additives. Examples of such additives include adhesion promoters, such as 3-glycidyloxypropyltrimethoxysilane or 3-methacryloxypropyltrimethoxysilane, anti-foaming agents, thermal or UV stabilizers, rheological additives, and flow and leveling additives, crosslinkers, chain extender, reinforcing fillers, non-reinforcing fillers, plasticizers, flame retardants and heat resistant agents, such as triazole compounds, water scavengers, biocides, curing accelerators, (fluorescent) dyes, inhibitors, antistatic agents, waxes catalysts and additives familiar to the person skilled in the art.

The invention further relates to a process for dispersing solid particles in a non-aqueous composition, comprising a) Providing a polysiloxane having a plurality of siloxane groups and at least one cyclic carboxylic anhydride group or the hydrolysis product thereof covalently linked to the polysiloxane, b) Providing solid filler particles, c) Including the components provided in step a) and step b) in a non-aqueous composition comprising a dispersion medium to form a dispersion base, and d) Subjecting the dispersion base to shear-force, wherein the content of the filler particles is in the range of from 500 to 2500 parts by weight per 100 parts by weight of the dispersion medium.

EXAMPLES

Comparative Dispersant

Synthesis of an Epoxy/Amine Adduct Copolymer Containing Polysiloxane Groups:

A four-neck flask fitted with stirrer, thermometer, dropping funnel, reflux condenser, and nitrogen inlet tube was charged with a monoamino-functional polysiloxane as described in example 1 of U.S. Pat. No. 9,217,083B2 (376.3 g) and 1,6-hexanediol diglycidyl ether (22.8 g) and heated to 140° C. under nitrogen. The epoxide conversion was monitored by means of 1H NMR. After full conversion of the epoxide groups, the reaction mixture was cooled to room temperature. GPC data Mn=5500 g/mol and PDI=2.0.

Preparation of Si—H Functional Intermediates

The synthesis of SiH functional silicone macromer of Butyl-$D_{25}M^H$ Mw 2000 was carried out as described in Example 1 of U.S. Pat. No. 8,304,077B2. The synthesis of Butyl-$D_{38.5}M^H$ and Butyl-$D_{65.5}M^H$ by adapting the ratio of Butyl Lithium to Hexamethylcyclotrisiloxane monomer.

Dispersant 1

Reaction of Butyl-$D_{25}M^H$ with a 30% Molar Excess of Allyl Succinic Anhydride In a flask equipped with stirrer, thermometer, reflux condenser and nitrogen inlet 181.15 g of Butyl-$D_{25}M^H$ were placed and heated to 75° C. Then 0.60 g of a 0.6% solution of $H_2PtCl_6$ in xylene was added. Subsequently 18.85 g of allyl succinic anhydride were added via a dropping funnel. The reaction mixture was kept at 100° C. for period of 3 hours. After this time the conversion of SiH groups was found to be above 98%. Volatiles were removed by rotary evaporation at 130° C. and 15 mbar.

GPC data of the resulting product: Mn 1759 g/mol, Mw 2232 g/mol, DPI 1.27

Dispersant 2

Reaction of Butyl-$D_{65.5}M^H$ with a 30% Molar Excess of Allyl Succinic Anhydride In a flask equipped with stirrer, thermometer, reflux condenser and nitrogen inlet143.91 g of Butyl-$D_{65.5}M^H$ were placed and heated to 75° C. Then 0.53 g of a 0.6% solution of $H_2PtCl_6$ in xylene was added. Subsequently 6.09 g of allyl succinic anhydride were added via a dropping funnel. The reaction mixture was kept at 100° C. for period of 3 hours. After this time the conversion of SiH groups was found to be above 98%. Volatiles were removed by rotary evaporation at 130° C. and 15 mbar.

GPC data of the resulting product: Mn 5630 g/mol, Mw 9153 g/mol, DPI 1.62

Dispersant 3

Reaction of Butyl-$D_{38.5}M^H$ with a 30% Molar Excess of Allyl Succinic Anhydride In a flask equipped with stirrer, thermometer, reflux condenser and nitrogen inlet 140.98 g of Butyl-$D_{38.5}M^H$ were placed and heated to 75° C. Then 0.53 g of a 0.6% solution of $H_2PtCl_6$ in xylene was added. Subsequently 9.02 g of allyl succinic anhydride were added via a dropping funnel. The reaction mixture was kept at 100° C. for period of 3 hours. After this time the conversion of SiH groups was found to be above 98%. Volatiles were removed by rotary evaporation at 130° C. and 15 mbar.

GPC data of the resulting product: Mn 2745 g/mol, Mw 3399 g/mol, DPI 1.21

Dispersant 4

Step 1

Preparation of a Siloxane Having an Average of One SiH Group of the Formula $MD_{38.5}M^H$ In a flask equipped with stirrer, thermometer and reflux condenser 9.46 g HMDSO (Hexamethyldisiloxane), 302.93 g $D_5$, and 37.61 g $M^H{}_2D_6$ were placed. The mixture was heated to 75° C. At this temperature, 3.5 g of catalyst K20 ex Clariant (Calcium montmorillonite treated with hydrochloric acid) were added to the mixture. The mixture was stirred at 80° C. for a period of 3 hours, followed by cooling to 50° C. and further stirring at this temperature for 3 hours. 1.75 g Harbolite 900 (Amorphous Alumina Silicate) filtration aid were added, and the mixture was stirred and filtered via a pressure filter. The content of SiH groups was determined via determination of the Iodine value, which was 8.14

Step 2

Reaction of the Siloxane of Step 1 with of Allyl Succinic Anhydride

In a flask equipped with stirrer, thermometer, reflux condenser and nitrogen inlet, 141.72 g of the siloxane of step 1 were placed and heated to 75° C. Then 0.53 g of a 0.6% solution of $H_2PtCl_6$ in xylene was added. Subsequently 8.28 g of allyl succinic anhydride were added via a dropping funnel. The reaction mixture was kept at 100° C. for period of 3 hours. After this time the conversion of SiH groups was found to be above 98%. Volatiles were removed by rotary evaporation at 130° C. and 15 mbar.

GPC data of the resulting product: Mn 1813 g/mol, Mw 5272 g/mol, DPI 2.91

Dispersant 5

Step 1

Preparation of a Siloxane Having an Average of One SiH Group of the Formula $MD_{65.5}M^H$ In a flask equipped with stirrer, thermometer, and reflux condenser 5.68 g HMDSO, 321.76 g $D_5$, and 22.57 g $M^H{}_2D_6$ were placed. The mixture was heated to 75° C. At this temperature, 3.5 g of catalyst K20 were added to the mixture. The mixture was stirred at 80° C. for a period of 3 hours, followed by cooling to 50° C. and further stirring at this temperature for 3 hours. 1.75 g Harbolite 900 filtration aid were added, and the mixture was stirred and filtered via a pressure filter. The content of SiH groups was determined via determination of the Iodine value, which was 4.81

Step 2

Reaction of the Siloxane of Step 1 with Allyl Succinic Anhydride

In a flask equipped with stirrer, thermometer, reflux condenser and nitrogen inlet 144.99 g of the siloxane of step 1 were placed and heated to 75° C. Then 0.53 g of a 0.6% solution of $H_2PtCl_6$ in xylene was added. Subsequently 5.01 g of allyl succinic anhydride were added via a dropping funnel. The reaction mixture was kept at 100° C. for period of 3 hours. After this time the conversion of SiH groups was found to be above 98%. Volatiles were removed by rotary evaporation at 130° C. and 15 mbar.

GPC data of the resulting product: Mn 2094 g/mol, Mw 8247 g/mol, DPI 3.94

Dispersant 6

Step 1

Preparation of a Siloxane Having an Average of One SiH Group of the Formula $MD_{86}M^H$ In a flask equipped with stirrer, thermometer, and reflux condenser 4.35 g HMDSO, 328.31 g $D_5$, and 17.33 g $M^H{}_2D_6$ were placed. The mixture was heated to 75° C. At this temperature, 3.5 g of catalyst K20 were added to the mixture. The mixture was stirred at 80° C. for a period of 3 hours, followed by cooling to 50° C. and further stirring at this temperature for 3 hours. 1.75 g Harbolite 900 filtration aid were added, and the mixture was stirred and filtered via a pressure filter. The content of SiH groups was determined via determination of the Iodine value, which was 3.48.

Step 2

Reaction of the Siloxane of Step 1 with Allyl Succinic Anhydride

In a flask equipped with stirrer, thermometer, reflux condenser and nitrogen inlet 146.34 g of the siloxane of step 1 were placed and heated to 75° C. Then 0.53 g of a 0.6% solution of $H_2PtCl_6$ in xylene was added. Subsequently 3.66 g of allyl succinic anhydride were added via a dropping funnel. The reaction mixture was kept at 100° C. for period of 3 hours. After this time the conversion of SiH groups was found to be above 98%. Volatiles were removed by rotary evaporation at 130° C. and 15 mbar.

GPC data of the resulting product: Mn 2240 g/mol, Mw 11034 g/mol, DPI 4.93

Dispersant 7

Step 1

Preparation of a Siloxane Having an Average of One SiH Group of the Formula $MD_{106}M^H$ In a flask equipped with stirrer, thermometer, and reflux condenser 3.55 g HMDSO, 332.33 g $D_5$, and 14.12 g $M^H{}_2D_6$ were placed. The mixture was heated to 75° C. At this temperature, 3.15 g of catalyst K20 were added to the mixture. The mixture was stirred at 80° C. for a period of 3 hours, followed by cooling to 50° C. and further stirring at this temperature for 3 hours. 1.75 g Harbolite 900 filtration aid were added, and the mixture was stirred and filtered via a pressure filter. The content of SiH groups was determined via determination of the Iodine value, which was 2.95.

Step 2

Reaction of the Siloxane of Step 1 with Allyl Succinic Anhydride

In a flask equipped with stirrer, thermometer, reflux condenser and nitrogen inlet 146.89 g of the siloxane of step 1 were placed and heated to 75° C. Then 0.53 g of a 0.6% solution of $H_2PtCl_6$ in xylene was added. Subsequently 3.11 g of allyl succinic anhydride were added via a dropping funnel. The reaction mixture was kept at 100° C. for period of 3 hours. After this time the conversion of SiH groups was found to be above 98%. Volatiles were removed by rotary evaporation at 130° C. and 15 mbar.

GPC data of the resulting product: Mn 2255 g/mol, Mw 13177 g/mol, DPI 5.37

Dispersant 8

Step 1

Preparation of a Siloxane Having an Average of One SiH Group of the Formula $MD_{133}M^H$ In a flask equipped with stirrer, thermometer, and reflux condenser 2.84 g HMDSO, 335.86 g $D_5$, and 11.30 g $M^H{}_2D_6$ were placed. The mixture was heated to 75° C. At this temperature, 3.15 g of catalyst K20 were added to the mixture. The mixture was stirred at 80° C. for a period of 3 hours, followed by cooling to 50° C. and further stirring at this temperature for 3 hours. 1.75 g Harbolite 900 filtration aid were added, and the mixture was stirred and filtered via a pressure filter. The content of SiH groups was determined via determination of the Iodine value, which was 2.54.

Step 2

Reaction of the Siloxane of Step 1 with Allyl Succinic Anhydride

In a flask equipped with stirrer, thermometer, reflux condenser and nitrogen inlet 147.31 g of the siloxane of step 1 were placed and heated to 75° C. Then 0.53 g of a 0.6% solution of $H_2PtCl_6$ in xylene was added. Subsequently 2.69 g of allyl succinic anhydride were added via a dropping funnel. The reaction mixture was kept at 100° C. for period of 3 hours. After this time the conversion of SiH groups was found to be above 98%. Volatiles were removed by rotary evaporation at 130° C. and 15 mbar.

GPC data of the resulting product: Mn 2717 g/mol, Mw 16878 g/mol, DPI 6.21

Dispersant 9

Hydrolysis of Dispersant 5 with Deionized Water

In a flask equipped with stirrer, thermometer, reflux condenser and nitrogen inlet 248.29 g of dispersant 5 described above and 1.7 g of deionized water were placed. The mixture was stirred and heated at 70° C. for a period of 10 hours. After this time 89 mole-% of the cyclic carboxylic anhydride groups were found to be hydrolyzed to dicarboxylic acid groups. Volatiles were removed by rotary evaporation at 130° C. and 15 mbar.

Dispersant 10

Salt formation of Dispersant 9

In a glass beaker 116.19 g of dispersant 9 were mixed with 3.81 g of N,N-dibutyl ethanol amine.

In the following the application of dispersing agents in addition curing RTV silicone formulations is described.

For the preparation of addition curing RTV silicone compositions a dual asymmetric centrifuge mixer, Speedmixer DAC 400.1 FVZ, Hauschild GmbH & Co. KG was used.

Raw Materials:

- Addition-curing, RTV-2 silicone rubber Part A (SilGel 612A, Wacker)—Vinylpolydimethylsiloxane and additives
- Addition-curing, RTV-2 silicone rubber Part B (SilGel 612 B, Wacker) SiH—functional polydimethylsiloxanes and Polydimethylsiloxane with functional groups and additives including platinum catalyst
- Adhesion Promoter—Methacryloxypropyltrimethoxysilane
- Filler 1—Aluminum oxide—average particle size 1.4 μm
- Filler 2—Aluminum oxide—average particle size 45.0 μm
- Filler 3—Aluminum oxide—average particle size 0.2 mm For the determination of the curing behavior of the silicone composition and the influence of the dispersing agent on that application property the formulation was evaluated in a non-filled system. Part A and B were formulated separately in a PE Speedmixer cup by dosing all respective raw materials of Part A or Part B and homogenized for 30 sec at 2.500 rpm. Afterwards Part A and Part B were mixed with a mixing ratio A:B of 1.5:1 with the Speedmixer for 30 sec at 2.000 rpm and were stored in the oven at 100° C. until the formulation was cured. The formulations were observed at intervals of 60 sec to evaluate the curing stage. The time when the first skin was built on the surface of the formulation is defined as the skin forming time. The time of the fully cured formulation with no further change of hardness and viscosity is defined as the curing time.

| | Raw Material | Control (w/o dispersant) Ratio [g] | Test with Dispersant Ratio [g] |
|---|---|---|---|
| Part A | Addition-curing, RTV-2 silicone rubber Part A | 15 | 15 |
| | Adhesion promoter | 0.25 | 0.25 |
| | Dispersant | 0 | 1.2 |
| Part B | Addition-curing, RTV-2 silicone rubber Part B | 10 | 10 |
| | Dispersant | 0 | 0.8 |

Application results non-filled silicone composition:

| | Skin forming time [min] | Curing time [min] |
|---|---|---|
| Control | 3 | 5 |
| Comparative dispersant | No skin | No curing |
| Dispersant 1 | 5 | 15 |
| Dispersant 3 | 8 | 25 |
| Dispersant 2 | 3 | 12 |
| Dispersant 4 | 3 | 12 |
| Dispersant 5 | 3 | 12 |
| Dispersant 6 | 8 | 15 |
| Dispersant 7 | 8 | 15 |
| Dispersant 8 | 4 | 10 |

From the table above it can be concluded that the comparative dispersant completely prevents curing of the silicone rubber. The dispersants according to the invention have only a weak influence on the curing properties, which can be adjusted by the amount of curing catalyst.

For the evaluation of the influence of the dispersants on the viscosity of highly filled silicone compositions aluminum oxide filled addition curing RTV-2 compositions were formulated.

Part A of the RTV 2 composition was formulated in a PE Speedmixer cup by dosing the silicone gel, the adhesion promoter and the dispersing agent and homogenized them with the Speedmixer for 30 sec at 2.500 rpm. Afterwards the $Al_2O_3$ filler was dosed in one shot and homogenized for 30 sec at 2.500 rpm.

The viscosity of the formulated Part A was determined with a rheometer, AntonPaar MCR 201 under the following conditions: PP 25, shear rate 0.1-100 s-1, 1.0 mm gap, 23° C., sample trimming. In particular, the viscosity at 1 $s^{-1}$ and 10 $s^{-1}$ were observed to describe the viscosity of the filled and modified composition.

Part B of the RTV 2 composition was formulated in a PE Speedmixer cup by dosing the silicone gel and the dispersing agent and homogenized them with the Speedmixer for 30 sec at 2.500 rpm. Afterwards the $Al_2O_3$ filler was dosed in one shot and homogenized for 30 sec at 2.500 rpm.

Part A and Part B were mixed with the Speedmixer for 30 sec at 2.000 rpm and were stored in the oven at 100° C. until the formulation was cured. The formulations were observed in intervals of 60 sec to evaluate the curing stage analogue to the unfilled system.

| | Raw Material | Control (w/o Dispersant) Ratio [g] | Test with Dispersant Ratio [g] |
|---|---|---|---|
| Part A | Addition-curing, RTV-2 silicone rubber Part A | 15 | 15 |
| | Adhesion promoter | 0.25 | 0.25 |
| | Dispersant | 0 | 1.2 |
| | Filler 1 | 40 | 40 |
| | Filler 2 | 40 | 40 |
| | Filler 3 | 40 | 40 |
| Part B | Addition-curing. RTV-2 silicone rubber Part B | 10 | 10 |
| | Dispersant | 0 | 0.8 |
| | Filler 1 | 26.7 | 26.7 |
| | Filler 2 | 26.7 | 26.7 |
| | Filler 3 | 26.7 | 26.7 |

Application results filled silicone composition:

| | Viscosity at 1 $s^{-1}$ [Pas] | Viscosity at 10 $s^{-1}$ [Pas] | Skin forming time [min] | Curing time [min] |
|---|---|---|---|---|
| Control | 3042.3 | 40.3 | 3 | 5 |
| Comparative Dispersant | 681.8 | 217.3 | No skin | No curing |
| Dispersant 3 | 183.8 | 71.3 | 5 | 25 |
| Dispersant 2 | 171.5 | 80.2 | 5 | 12 |
| Dispersant 4 | 253.7 | 91.7 | 8 | 15 |
| Dispersant 5 | 175.9 | 86.0 | 5 | 12 |
| Dispersant 6 | 232.3 | 130.1 | 5 | 20 |
| Dispersant 7 | 298.9 | 155.2 | 5 | 20 |
| Dispersant 8 | 366.3 | 146.8 | 5 | 20 |
| Dispersant 9 | 204.8 | 102.9 | 3 | 20 |
| Dispersant 10 | 367.2 | 117.6 | 3 | 30 |

From the table above it can be concluded that the effect of the dispersants according to the invention on viscosity reduction in the highly filled silicone composition is significantly stronger compared to the comparative dispersant. In contrast to the comparative dispersant, the dispersants according to the invention to not prevent curing.

One of the major applications for thermal conductive filler filled silicone compositions are thermal interface materials (TIM) and the application of those materials on copper substrates. For this application, the corrosion properties of the dispersants were evaluated on the respective substrate. The pure dispersant was dropped on copper, covered with a cotton pad and stored in a climate chamber for 14 days at 55° C. and 80% relative humidity. In a second test the non-filled silicone composition including the dispersant was applied with a spatula on copper covered with a cotton pad and stored in the climate chamber for 14 days at 55° C. and 80% rel. humidity. The corrosion of the copper substrate was evaluated visually and ranked on a scale of 1 to 6.

| | Corrosion pure additive - 14 days, 50° C., 80% rel. hum. (1 = no corrosion, 6 = significant corrosion) | Corrosion unfilled formulation - 14 days, 50° C., 80% rel. hum. (1 = no corrosion, 6 = significant corrosion) |
|---|---|---|
| Control | 1 | 1 |
| Comparative dispersant | 6 | 5 |
| Dispersant 1 | 6 | 3 |
| Dispersant 3 | 4 | 2 |
| Dispersant 2 | 3 | 1-2 |
| Dispersant 4 | 3 | 2 |
| Dispersant 5 | 3 | 1 |
| Dispersant 6 | 3 | 1 |
| Dispersant 7 | 2-3 | 1-2 |
| Dispersant 8 | 3 | 2 |
| Dispersant 9 | 3 | 2 |
| Dispersant 10 | 3 | 1 |

From the table above it can be concluded that the dispersants according to the invention cause less corrosion than the comparative dispersant on a copper substrate.

The influence of dispersants on the viscosity reduction with different filler types was evaluated by modifying Part A of the described formulation with calcium carbonate, boron nitride and aluminiumhydroxide and the dispersing additives. The viscosity of the formulated Part A was determined with a rheometer, AntonPaar MCR 201 under the following conditions: PP 25, shear rate 0.1-100 s-1, 1.0 mm gap, 23° C., sample trimming. The viscosity at 1 $s^{-1}$ was recorded.

Fillers:

Calcium Carbonate—CaCO3—mean particle size 5 μm

Alum inumhydroxide—Al(OH)3—mean partice size 12 μm

Boron Nitride—EN—mean partice size 16 μm

Formulation Calcium Carbonate:

| | Raw Material | Control (w/o Dispersant) Ratio [g] | Test with Dispersant Ratio [g] |
|---|---|---|---|
| Part A | Addition-curing, RTV-2 silicone rubber Part A | 15 | 15 |
| | Adhesion Promoter | 0.25 | 0.25 |
| | Dispersing Agent | 0 | 0.19 |
| | CaCO3 | 37 | 37 |

Formulation Aluminumhydroxide

| | Raw Material | Control (w/o Dispersant) Ratio [g] | Test with Dispersant Ratio [g] |
|---|---|---|---|
| Part A | Addition-curing, RTV-2 silicone rubber Part A | 15 | 15 |
| | Adhesion Promoter | 0.25 | 0.25 |
| | Dispersing Agent | 0 | 0.75 |
| | Al(OH)3 | 75 | 75 |

Formulation Boron Nitride

| | Raw Material | Control (w/o Dispersant) Ratio [g] | Test with Dispersant Ratio [g] |
|---|---|---|---|
| Part A | Addition-curing, RTV-2 silicone rubber Part A | 15 | 15 |
| | Adhesion Promoter | 0.25 | 0.25 |
| | Dispersing Agent | 0 | 0.85 |
| | BN | 17 | 17 |

The impact of the comparative and inventive dispersing additives on the viscosity reduction of the composition is shown in the following table:

| | | Control | Dispersant 5 |
|---|---|---|---|
| CaCO3 | Viscosity at 1 $s^{-1}$ [Pas] | 987 | 123 |
| Al(OH)3 | Viscosity at 1 $s^{-1}$ [Pas] | 2448 | 481 |
| BN | Viscosity at 1 $s^{-1}$ [Pas] | 1722 | 1316 |

From the Table above it can be concluded that Dispersant 5 significantly reduces the viscosity of addition curing RTV-2 compositions with different fillers.

The invention claimed is:

1. A non-aqueous composition comprising a polysiloxane having a plurality of siloxane groups and one cyclic carboxylic anhydride group or a hydrolysis product thereof covalently linked to the polysiloxane, a dispersion medium, and solid filler particles, wherein the content of the filler particles is in the range of 500 to 2500 parts by weight per 100 parts by weight of the dispersion medium.

2. The composition according to claim 1, wherein the dispersion medium comprises a silicone which is different from the polysiloxane.

3. The composition according to claim 2, wherein the silicone is a crosslinkable silicone.

4. The composition according to claim 1, wherein the average particle size of solid filler is in the range of 0.1 to 500.0 μm.

5. The composition according to claim 1, wherein the solid filler particles comprise aluminum oxide particles.

6. The composition according to claim 5, wherein the aluminum oxide particles comprise at least one of spherical aluminum oxide particles having an average particle size range in the range of 1.0 to 50.0 μm and irregular-shaped aluminum oxide particles having an average particle size in the range of 0.1 to 50.0 μm.

7. The composition according to claim 1, wherein said polysiloxane has a number average molecular weight Mn in the range of 500 to 10000 g/mol.

8. The composition according to claim 1, wherein said polysiloxane is present in an amount of 0.010 to 10.000 percent by weight, calculated on the total weight of the composition.

9. A process for dispersing solid filler particles in a non-aqueous composition, comprising providing a polysiloxane having a plurality of siloxane groups and one cyclic carboxylic anhydride group or a hydrolysis product thereof covalently linked to the polysiloxane, providing solid filler particles, including the polysiloxane and filler particles in a non-aqueous composition comprising a dispersion medium to form a dispersion base, and subjecting the dispersion base to shear force, wherein the content of the filler particles is in the range of 500 to 2500 parts by weight per 100 parts by weight of the dispersion medium.

10. The composition according to claim 1, wherein the cyclic carboxylic anhydride group forms a 5-membered ring.

11. The composition according to claim 1, wherein the cyclic carboxylic anhydride group or the hydrolysis product thereof is linked to the polysiloxane via an Si-C bond.

12. The composition according to claim 1, wherein on average 0.7 to 3.0 cyclic carboxylic anhydride groups or the hydrolysis product thereof are covalently linked to a polysiloxane molecule.

13. An electronic component including the cured composition of claim 1 as a thermal interface material.

14. The process according to claim 9, wherein the cyclic carboxylic acid group forms a 5-membered ring.

15. The process according to claim 9, wherein the cyclic carboxylic anhydride group or the hydrolysis product thereof is linked to the polysiloxane via an Si-C bond.

16. The process according to claim 9, wherein on average 0.7 to 3.0 cyclic carboxylic anhydride groups or the hydrolysis product thereof are covalently linked to a polysiloxane molecule.

17. The composition according to claim 1, wherein the dispersion medium comprises a silicone which is different from the polysiloxane.

* * * * *